July 12, 1960 W. T. BLAKE 2,944,681
RAILWAY DRAFT APPLIANCE
Filed July 22, 1957 7 Sheets-Sheet 1
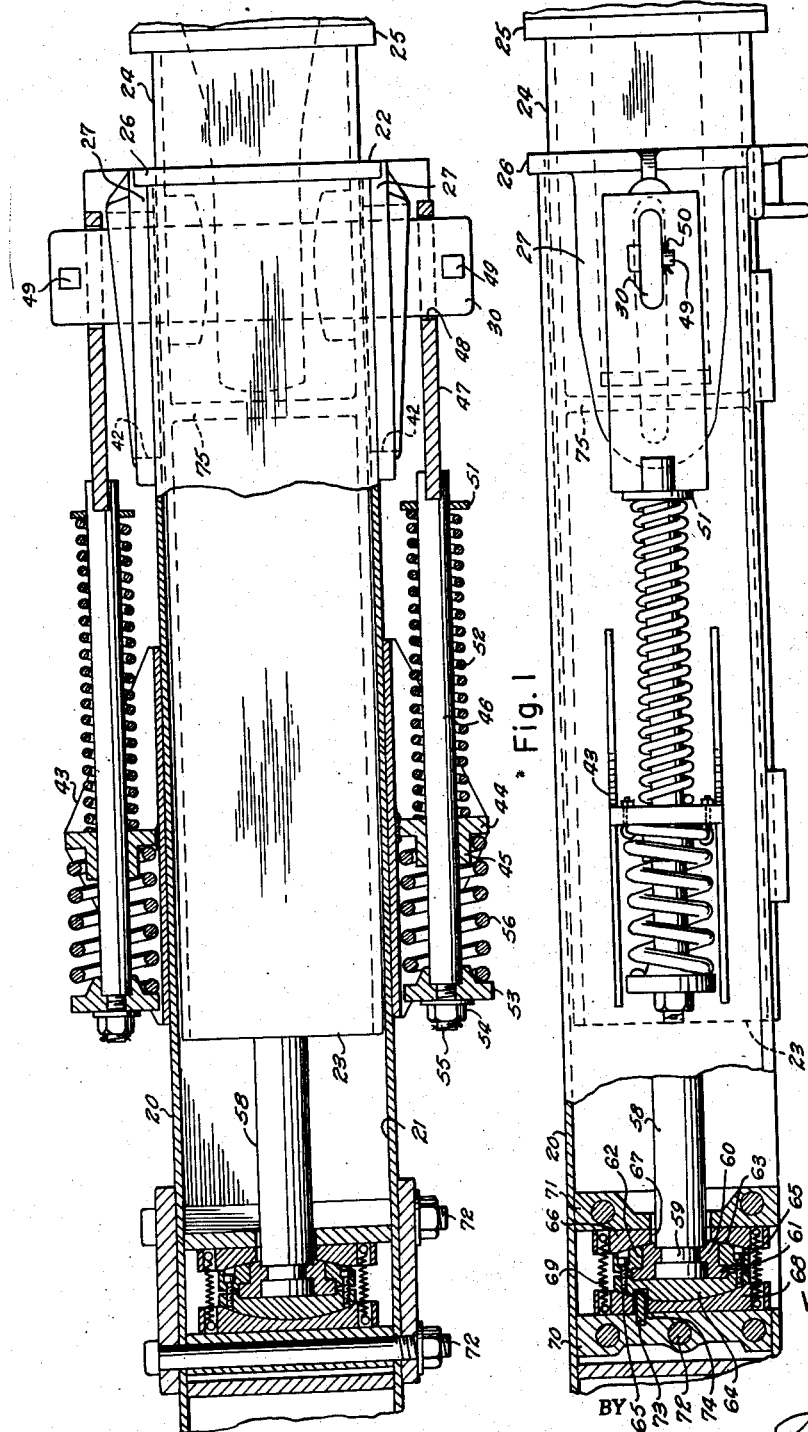
INVENTOR
William T. Blake
BY John O. Evans, Jr.
ATTORNEY July 12, 1960 W. T. BLAKE 2,944,681
RAILWAY DRAFT APPLIANCE
Filed July 22, 1957 7 Sheets-Sheet 2

William T. Blake
INVENTOR

BY John O. Evans, Jr.
ATTORNEY

July 12, 1960   W. T. BLAKE   2,944,681
RAILWAY DRAFT APPLIANCE
Filed July 22, 1957   7 Sheets-Sheet 3
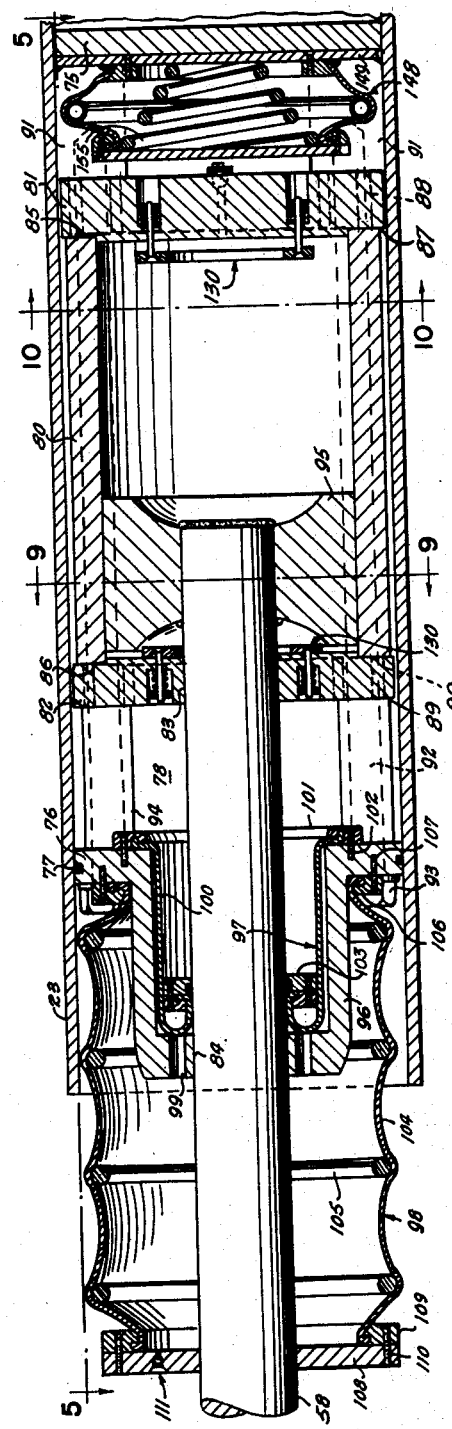
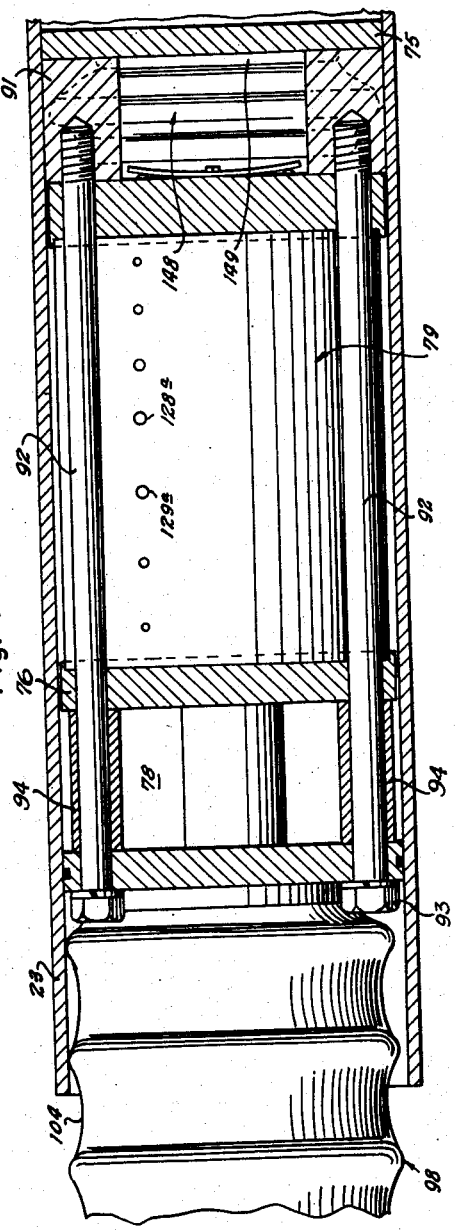
William T. Blake
INVENTOR
BY John O. Evans, Jr.
ATTORNEY

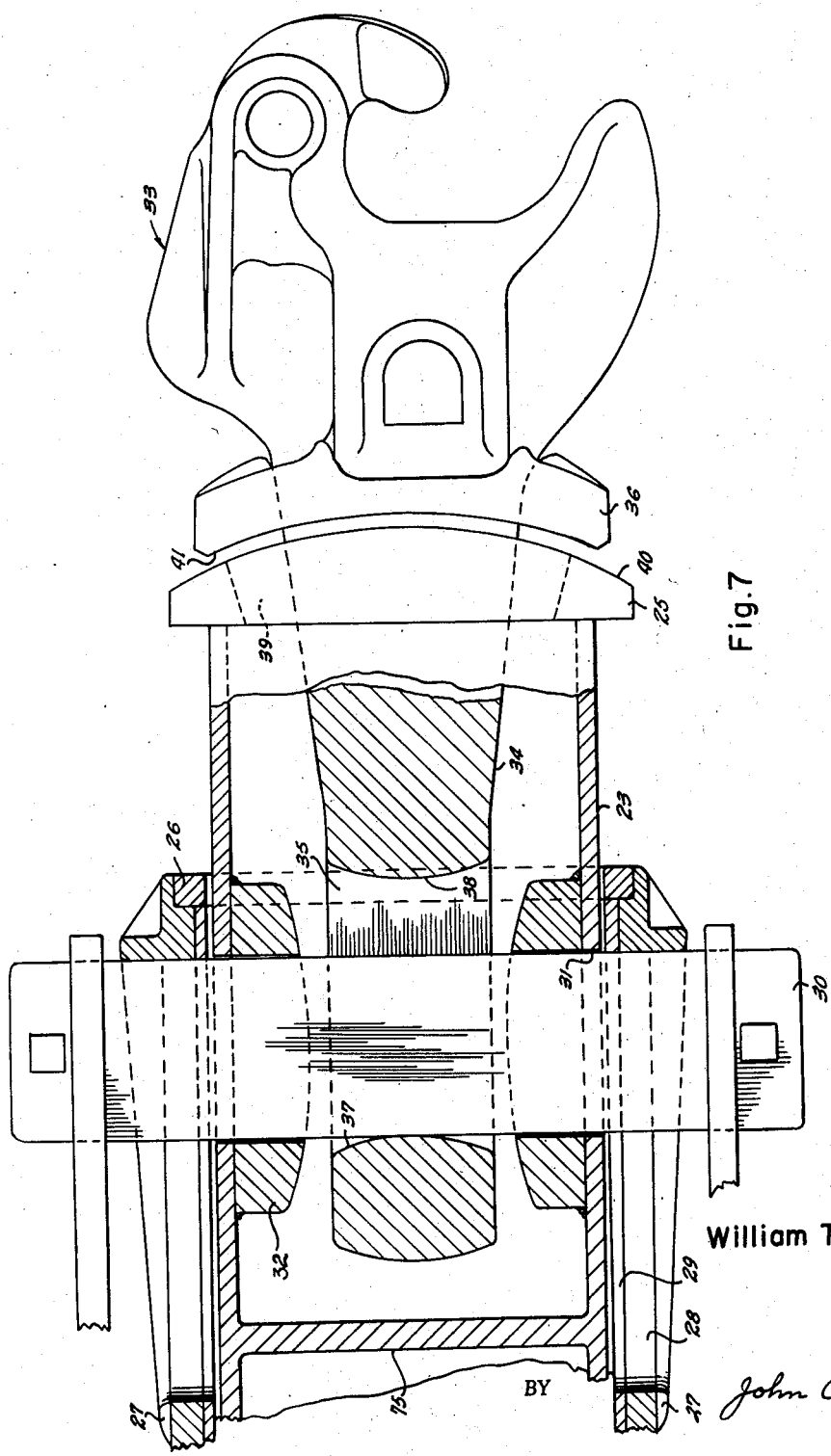

July 12, 1960 W. T. BLAKE 2,944,681
RAILWAY DRAFT APPLIANCE
Filed July 22, 1957 7 Sheets-Sheet 5

William T. Blake
INVENTOR

BY John O. Evans, Jr.
ATTORNEY

July 12, 1960 W. T. BLAKE 2,944,681
RAILWAY DRAFT APPLIANCE
Filed July 22, 1957 7 Sheets-Sheet 6

INVENTOR
William T. Blake

BY John O. Evans, Jr.
ATTORNEY

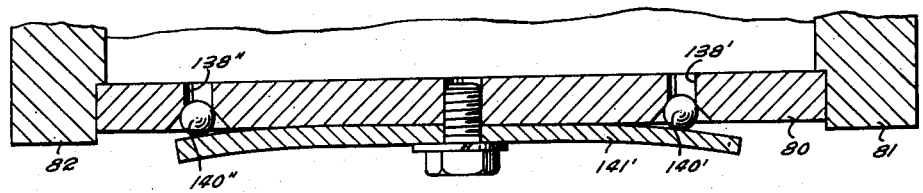
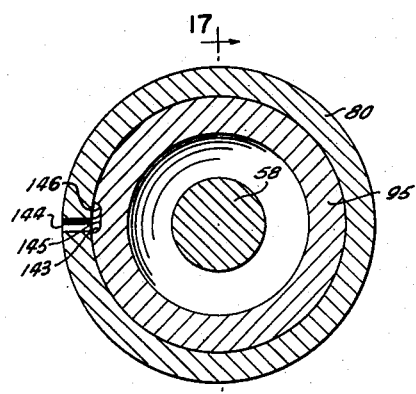
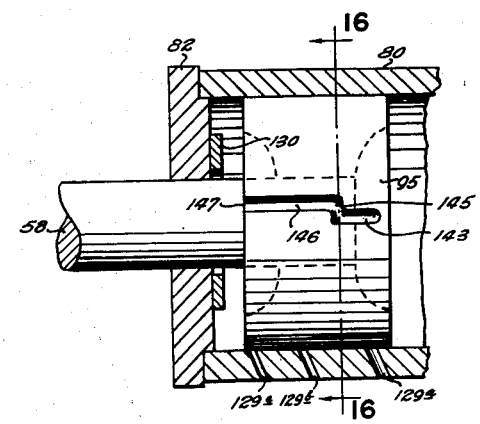
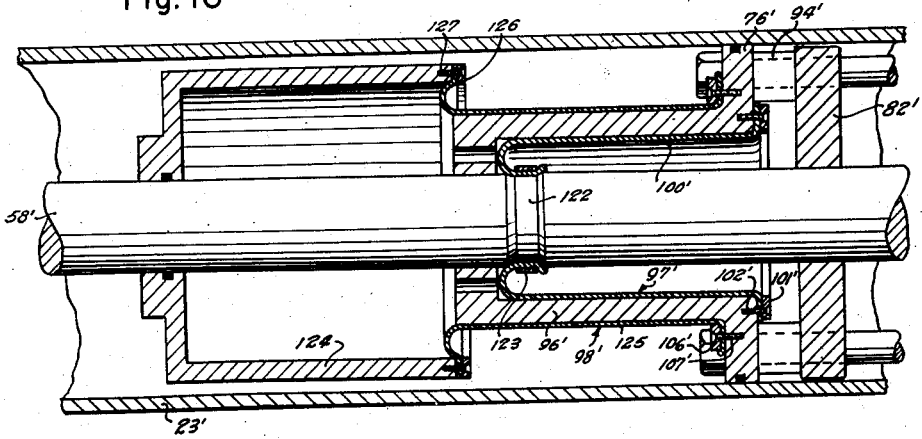

2,944,681
RAILWAY DRAFT APPLIANCE

William T. Blake, 4424 Morris Court, Fort Worth, Tex.

Filed July 22, 1957, Ser. No. 673,238

24 Claims. (Cl. 213—43)

This invention relates to railway draft appliances and more particularly to a railway draft gear incorporating a hydraulic buffer mechanism.

This application is a continuation-in-part of my prior copending application Serial No. 600,977, filed July 30, 1956, for Hydraulic Mechanism, said application Serial No. 600,977 being a continuation-in-part of my prior copending application Serial No. 479,546, now abandoned, filed January 3, 1955, for Hydraulic Mechanism.

It is well known that railway cars, particularly freight cars, are subjected to many impacts or shocks of relatively great magnitude and that such impacts or shocks are amplified or multiplied by the number of cars in a given train. This is due in part to the fact that there is a certain amount of slack between the couplers of the cars. The cars tend to "bunch" or crowd together on slowing or stopping of the prime mover or engine, on down grades and on entering curves, whereby each car bumps the car forwardly thereof and the combined impact of all of said cars is transmitted to the slower traveling foremost car. On initial movement or acceleration of the engine, on up grades and on leaving curves, the cars tend to "stretch" or move away from one another so as to be jerked by the faster traveling cars thereahead and the combined stress or relative movement of all of the cars is exerted upon the rearmost car. Manifestly, these impacts or shocks damage the cars and particularly their contents as well as wear the couplers to thereby produce greater impacts or shocks in the future. Also, other equipment and machinery are subjected to similar shocks due to sudden stops, impacts, or changes in the direction of movement.

Moreover, when freight trains are made up severe impact stresses are set up in the couplers and draft gear and great shocks are imparted to the contents of the cars when cars are moved into impact with each other in effecting coupling.

Accordingly, one object of the invention is to provide an improved draft appliance for railway cars of such construction as to be particularly adapted to reduce appreciably the impacts or shocks exerted on railway cars and their contents when such cars are made up into trains and the trains are moved upon the tracks.

A particular object of the invention is to provide an improved hydraulically-buffered draft appliance capable of being readily installed in the center sill of a conventional railway car.

Another object of the invention is to provide an improved draft appliance having means for mounting the hydraulic buffer mechanism in the railway car so that the buffer mechanism will function properly under all conditions of train operation and so that the buffer mechanism will be properly protected from undue stresses.

An important object of the invention is to provide an improved arrangement for attaching a coupler to the draft appliance of the present invention.

Another object of the invention is to provide an improved draft appliance that will slide readily in the center sill of a railway car without binding.

Another object of the invention is to provide an improved hydraulic shock-resisting mechanism for use especially in the draft gears of railway cars. Such shock-resisting hydraulic mechanism embodies a number of novel features that contribute to the over-all efficiency of operation of the mechanism.

Another object of the invention is to provide a shock-resisting hydraulic mechanism of the foregoing character in which the several parts of the mechanism are conveniently assembled to form a rigid and sturdy device.

Another object of the invention is to provide a novel sealing means for the piston rod of the shock-resisting hydraulic mechanism.

The foregoing, and other aims, objects and advantages of the invention as may appear hereinafter, are realized in a railway car having a center sill and the like including a draft appliance having a housing supported in and slidable longitudinally in the center sill. The housing encloses a hydraulic buffer mechanism having an operating rod extending rearwardly from the housing. The operating rod is anchored at its rearward end to the center sill. Complementary stop means carried by the housing and center sill limit forward and rearward movement of the housing in the center sill. A coupler or the like is provided for applying buff and draft forces to the housing.

As will be pointed out more fully hereinafter, springs are associated with the draft appliance housing and center sill urging the housing to a neutral position in the center sill.

The invention also provide a unique arrangement for attachment of the coupler shank to the housing of the draft appliance.

The hydraulic shock-resisting mechanism forming a part of the draft appliance of the present invention embodies improvements contributing to the over-all efficiency of operation of the invention. The means for mounting the hydraulic mechanism in the housing of the appliance will be developed more fully hereinafter.

The present invention also involves improvements in means for sealing the operating rod or piston rod where it passes through the wall of the housing.

Other features of the present invention will appear as the description proceeds and are particularly pointed out in the claims.

Exemplary forms of the invention are illustrated in the drawings in which:

Fig. 1 is a plan view of a portion of a draft appliance in accordance with the invention installed in the center sill of a railway car, some parts being broken away and others being shown in medial transverse section;

Fig. 2 is a side elevational view of the draft appliance shown in Fig. 1, certain parts being shown in vertical axial section;

Fig. 4 is a horizontal sectional view on an enlarged scale of the hydraulic mechanism embodied in the draft appliance of Figs. 1 to 3;

Fig. 5 is a sectional view of the hydraulic mechanism taken along the line 5—5 of Fig. 4;

Fig. 7 is a horizontal sectional view on a still further enlarged scale of the front end of the draft appliance shown in Figs. 1 to 3 illustrating the coupler and its relation to the draft appliance;

Fig. 15 is an enlarged, fragmentary sectional view taken along the line 15—15 of Fig. 9;

Fig. 16 is a sectional view taken along the line 16—16 of Fig. 17 showing certain details of the piston and cylinder construction of the hydraulic mechanism, assembly views of which appear in Figs. 4 to 6;

Fig. 17 is a sectional view taken along the line 17—17 of Fig. 16 showing the piston in full view; and Fig. 18 is a fragmentary view of another form of piston rod sealing arrangement for the hydraulic mechanism.

Figure 3:
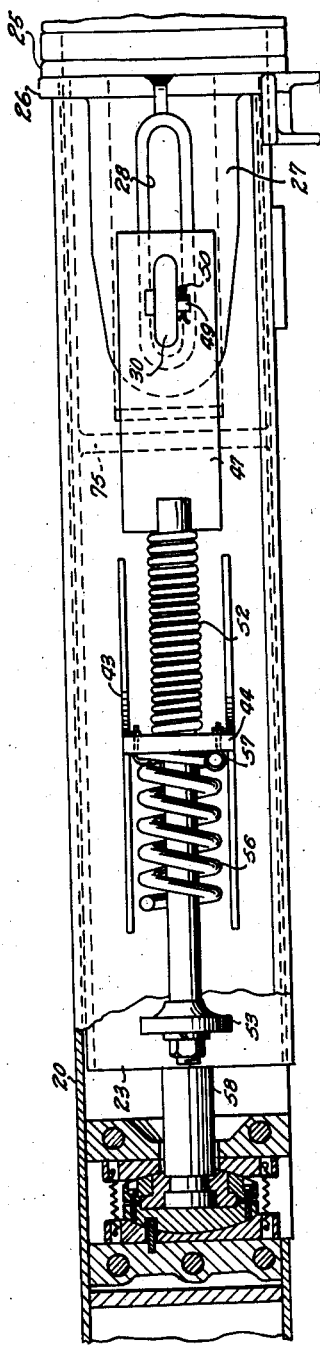
Fig. 3 is a view similar to Fig. 2 of the draft appliance with the parts being shown in a different operative position.

The draft appliance of the invention as shown in Figs. 1 to 3 is adapted to be operatively associated with the center sill 20 of an existing railway car. The center sill has the usual draft gear pocket 21 that is open at the front end 22. A housing 23 is slidingly received in the draft gear pocket of the center sill. The front end 24 of the housing projects forwardly from the draft gear pocket and is provided with a striker collar 25 that is integral with the housing. A striker plate 26 surrounds the front opening of the draft gear pocket and the front face of the striker plate is adapted to engage the rear face of the striker collar, as shown in Fig. 3, to limit rearward movement of the housing in the center sill.

Figure 8:
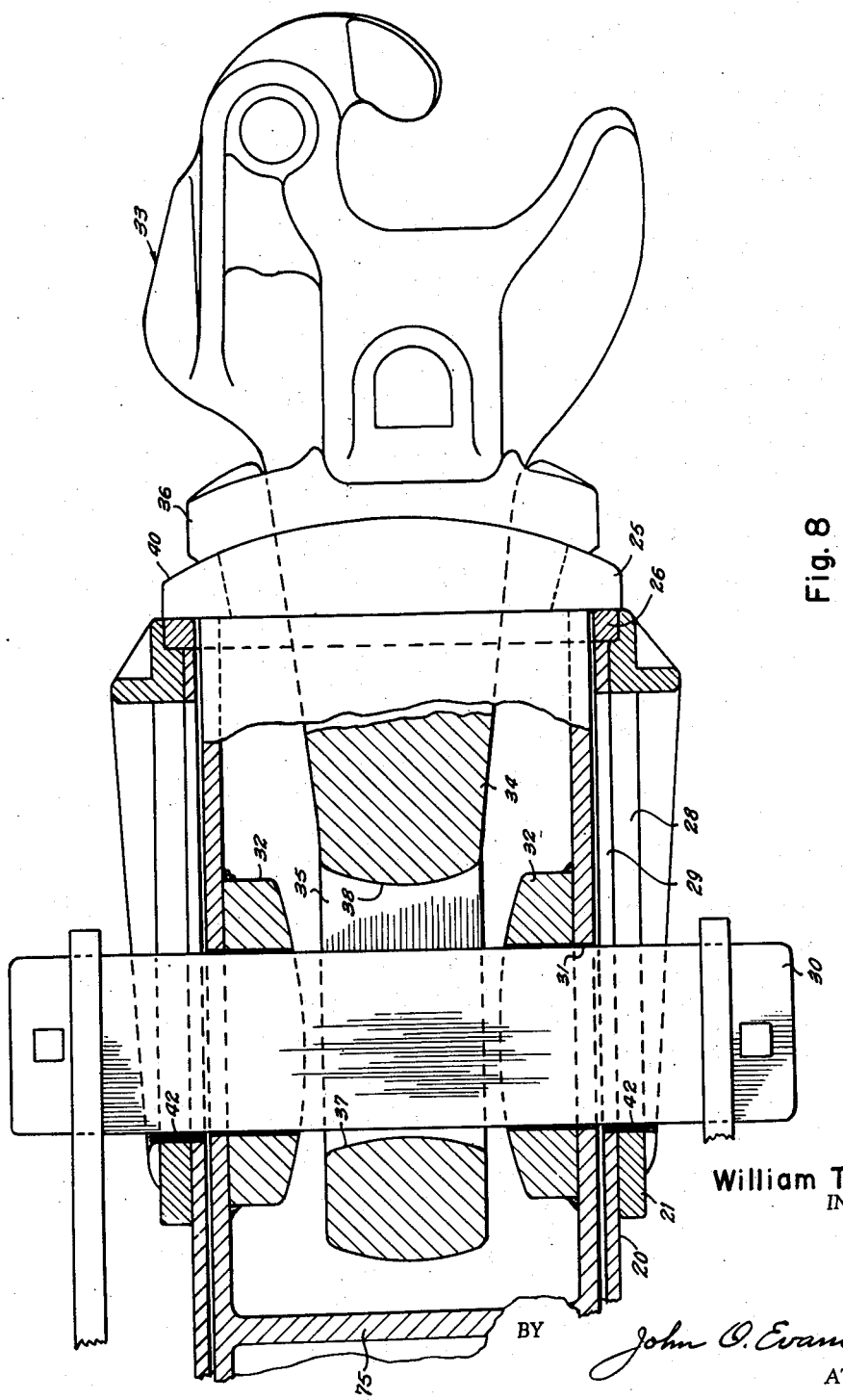
Fig. 8 is a view similar to Fig. 7 showing the parts in another operative position.

A pair of slotted side plates 27, 27 are welded, or otherwise suitably secured, to the side walls of the center sill just to the rear of the striker plate 26. Longitudinal slots 28 are formed in the side plates and corresponding slots 29 are cut through the side walls of the center sill as shown in Figs. 7 and 8. A transverse key 30 extends horizontally through the housing 23 and is mounted in slots 31 in the housing (see Figs. 7 and 8) that closely confine the key and make it, in effect, a part of the housing that moves back and forth with the housing as it slides in the center sill. Reinforcing blocks 32 are welded to the interior side walls of the housing. These blocks surround the key 30 and aid in securing it to the housing.

As shown in Fig. 7, the parts are in full pullout position and it will be seen that the key 30 abuts the forward walls of the slots 28 and 29 thereby to limit forward movement of the housing in the center sill. In contrast, Fig. 8 shows the parts in full inward position with the striker collar 25 in abutment with the striker plate 26 to limit rearward movement of the housing 23 in the center sill.

Figs. 7 and 8 illustrate the manner in which the coupler 33 is mounted in the draft appliance. The coupler has a rearwardly extending shank 34 having a transverse slot 35 through which the key 30 extends. On the coupler shank just to the rear of the coupler knuckles is a shank collar 36. As will be understood from consideration of Fig. 7, the coupler may pivot to a limited extent horizontally about the draft key 30. The rear wall 37 of the slot 35 in the coupler shank is slightly curved as shown to allow the coupler to pivot about the key 30. The front wall 38 of the slot 35 is spaced sufficiently in front of the front of the key 30 to permit such pivotal movement to take place. Moreover, the forward end of the shank passes through a slot 39 in the striker collar 25 which is wide enough to permit the limited pivotal movement required of the coupler to allow a railway car including the draft appliance to negotiate a curve in the track. The forward face 40 of the striker collar 25 is cylindrically curved with the axis of the cylinder corresponding approximately to the virtual pivotal axis of the coupler. The rear face 41 of the shank collar 36 is provided with a complementary concave cylindrical surface.

From an inspection of Fig. 7, it will be seen that the distance from the rear wall 37 of the shank slot 35 to the rear face 41 of the shank collar 36 is somewhat greater than the distance from the rear edge of the key 30 to the forward face 40 of the striker collar 25. Thus, in the full pull-out position of Fig. 7, it is seen that there is a gap between the striker collar 25 and the shank collar 36 and that draft forces are transmitted to the housing 23 and also to the center sill 20 solely through the key 30 which is engaged by the rear wall 37 of the coupler shank slot 35.

A consideration of Fig. 8 shows that the distance from the front wall 38 of the shank slot 35 to the rear face of the shank collar 36 is less than the distance from the front edge of draft key 30 to the forward face 40 of the striker collar 25. Owing to these relationships, it is evident that, with the parts in the full buff position shown in Fig. 8, buff forces are transmitted from the coupler through the shank collar 36 to the striker collar 25 of the housing and thence to the striker plate 26 at the front end of the center sill.

In positions intermediate full pull-out and full buff position, the forces in buff are transmitted to the housing 23 from the coupler through the shank collar 36 and the striker collar 25 integral with the housing. In Fig. 8, it will be seen that the rear wall 37 of the slot 35 in the coupler shank is spaced slightly to the rear of the rear edge of the key 30 and that the front wall 38 of the slot is spaced substantially forwardly from the front edge of the key. It will also be observed that the rear edge of the key 30 is spaced slightly forwardly of the rear walls 42 of the longitudinal slots 28 and 29. Thus, no buff forces are transmitted to the housing or the center sill through the draft key 30.

Figs. 1 and 2 show the draft appliance of the invention in so-called neutral position, and Fig. 3 shows the draft appliance in full buff position. These figures illustrate the arrangement of a spring system that urges the draft appliance to assume its neutral position when displaced therefrom in either direction. In the neutral position, the housing 23 is located so that the front edge of the key 30 is slightly to the rear of the front end of the slots 28 and 29.

Brackets 43 are welded, or otherwise suitably affixed, to the opposite side walls of the center sill and positioned rearwardly of the slots in which the key 30 travels. Each bracket has a transversely extending web portion 44 having a bearing member 45 slidingly receiving a yoke rod 46. The front end of each yoke rod is connected to the key 30 by a yoke plate 47. The yoke plate is welded to the front end of the yoke rod and has a slot 48 fitting closely around the key 30. The yoke plate is retained on the key 30 by means of pins 49 passing through the key and held in place by cotter pins 50.

A collar 51 is mounted at the forward end of each yoke rod and a compression spring, or buff return spring, 52 surrounding the rod is compressed between the collar 51 and the front face of the bracket web portion 44. Spring 52 is thus seen to bias the yoke rod and yoke plate and with them the key 30 and housing 23 toward the full draft position.

The rear end of each yoke rod 46 is provided with a cap 53 secured to the rod by a nut 54 threaded to the rearwardly projecting stud 55. Compressed between the cap and the rear face of the bracket web portion 44 is another compression spring, or draft return spring, 56. This spring surrounds the rear end of the yoke rod and urges the yoke rod and housing rearwardly from their full pull-out position to neutral position. The draft return spring 56 is considerably stronger than the buff return spring 52. Since these springs are disposed in opposition to each other, the point where their forces balance each other is the neutral or rest position of the draft appliance.

When the draft appliance is moved to full buff position, as shown in Fig. 3, the yoke rod cap 53 is displaced from contact with the rear end of the draft return spring 56. The spring 56 is retained in the position shown by means of screw hooks 57 that hold the front end of the spring to the web portion 44 of the bracket. With no force applied to the coupler, the buff return spring 52 moves the yoke rod and housing forwardly until the cap 53 makes contact with the draft return spring 56; thereafter, very slight forward compression of the draft return spring 56 will counter-balance the forward bias of spring 52 to stop the parts in neutral position. When a strong draft force is applied to the coupler, spring 56 is further compressed as the housing is pulled to the full draft position, the spring 52 expanding forwardly as this movement occurs.

The hydraulic buffer that is contained within the housing 23, which buffer mechanism will be described more fully hereinafter, has a rearwardly projecting piston rod or operating rod 58. The piston rod is held stationary with reference to the center sill so that movement of the housing will result in the desired shock-resisting action of the buffer mechanism. Accordingly, the rear end of the piston rod is anchored in the following manner. As seen in Fig. 2, the rod 58 has a circumferential groove 59 near its terminus. A horizontally split ring 60 formed of two identical half-rings surrounds the rear end of the rod, being keyed into the groove 59 as shown. The split ring 60 provides a flange 61. Sweated over the split ring 60 is a draft ring 62. The draft ring being contracted upon the split ring 60 holds the latter securely to the end of the piston rod. The front face 63 of the draft ring and split ring assembly is convex and preferably takes the form of a segment of a sphere. A buff disc 64, similar to the draft ring in cross-section, is secured to the draft ring 62 by screws 65. The rear face of the buff disc 64 is also convex and preferably provides a spherical surface having substantially the same radius of curvature as the front face of the draft ring 62. It will be seen that the assembly including the split ring 60, the draft ring 62 and the buff disc 64 provides a knob at the end of the piston rod 58, the knob having a convex front face and a convex rear face.

In contact with the forward face of the knob is a draft plate 66 having a rearward concavity complementary to and in contact with the forward face of the knob. The draft plate has a central hole 67 through which the rod 58 extends with a loose fit. The front face of the draft plate is planar. A similar buff plate 68 is in contact with the rear face of the knob. The draft plate 66 and buff plate 68 sandwich the knob of the piston rod as shown, and the plates are urged toward each other by tension springs 69 stretched between the plates and secured thereto.

Transverse impact plates 70 and 71, bolted by means of bolts 72 to the side walls of the center sill, prevent longitudinal movement of the piston rod knob and the buff and draft plates associated therewith. The foregoing described construction firmly anchors the piston rod to the center sill.

For purposes which will appear more fully hereinafter, it is desired to prevent rotation of the piston rod 58. To this end a pin 73 is firmly mounted in the impact plate 70 and extends with a loose fit into a hole 74 in the buff plate 68 and buff disc 64. The pin is positioned off center and prevents any substantial rotation of the piston rod knob assembly and piston rod 58.

The draft plate 66 and buff plate 68 fit loosely on the knob assembly and are loosely received in the space between the transverse impact plates 70 and 71. The pin 73 fits loosely in the hole 74 as aforesaid. This loose construction permits the anchoring assembly to find a position such that the piston rod is properly aligned in the hydraulic buffer mechanism so that no undue stresses are imposed upon the hydraulic mechanism.

Referring now to Figs. 4, 5, 6, 9 and 10, showing the hydraulic mechanism that is contained in the housing 23, the piston rod 58 is shown as extending rearwardly to the left. The housing 23 is approximately square in cross-section and is adapted to slide freely in the center sill of the railway car. Near the forward end of the housing is an end wall 75. This forward end wall is positioned slightly to the rear of the rear end of the coupler shank, as can be seen in Fig. 8. The forward wall is integral with or sealed to the side walls of the housing to provide a fluid-tight joint.

Spaced rearwardly from the forward end wall 75 is a rear end wall 76. The rear end wall 76 is sealed to the side walls of the housing 23 by means of a sealing ring 77. The side and end walls of the housing define a chamber 78 in which is disposed a working cylinder designated by the general reference numeral 79. This working cylinder has tubular side walls 80 closed by a front end wall 81 spaced rearwardly from the partition 75. The rear end of the working cylinder is closed by a rear end wall 82 spaced forwardly of the rear end wall 76 of the housing. The rear end wall of the cylinder has a central bearing hole 83 in which the piston rod 58 slides. The piston rod 58 also passes through a bearing 84 in the rear end wall 76 of the housing and thence rearwardly to its anchor point.

The tubular side wall section 80 of the working cylinder is supported by the end walls 81 and 82, the ends of the tubular section being received in circular grooves 85 and 86 formed in the end walls 81 and 82, respectively.

Figure 10:
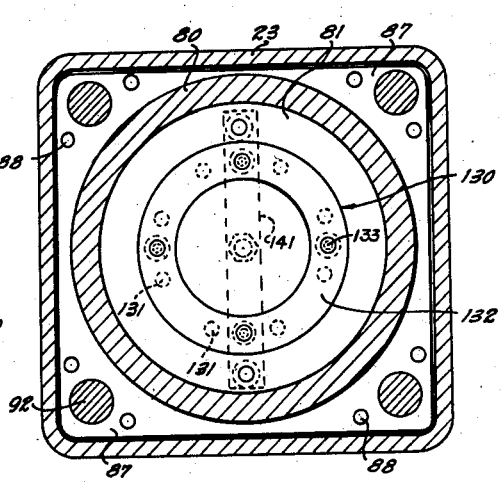
Fig. 10 is a sectional view taken along the line 10—10 of Fig. 4.

As seen in Fig. 10, the front end wall 81 of the cylinder has flange portions 87 extending radially so that the end wall conforms generally to the rectangular interior walls of the housing 23. Holes 88 are provided in flanges 87 to permit hydraulic fluid to circulate from one side of the end wall flanges to the other side. Also, the end wall fits rather loosely in the housing 23 leaving a small space between the periphery of the end wall of the cylinder and the walls of the housing 23 so that liquid may circulate through this space.

Figure 9:
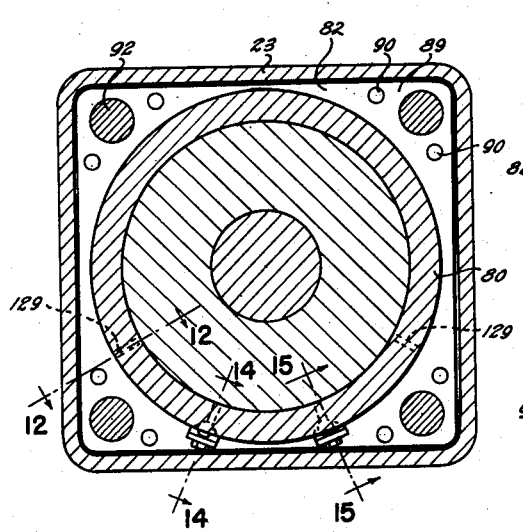
Fig. 9 is a sectional view taken along the line 9—9 of Fig. 4.

As shown in Fig. 9, the rear end wall of the cylinder is similar to the front end wall. The rear end wall has radial flange portions 89 providing holes 90 for circulation of liquid. The rear end wall fits loosely in the housing 23 so that some fluid circulation can take place around the periphery of the end wall.

Anchor blocks 91 (see Figs. 4 and 5) are welded in the four forward corners of the chamber 78. These blocks are threaded to receive four bolts 92 that extend from the rear end wall of the housing to the anchor blocks. The bolts are provided with heads 93 by which they may be tightened or loosened. The bolts pass through suitable holes in the rear end wall 76 of the housing, through spacer sleeves 94 that space the rear end wall 76 of the housing from the rear end wall 82 of the cylinder. The bolts then pass through holes in the flanges 89 of the rear end wall of the cylinder, through holes in the flanges 87 in the front end wall of the cylinder, and are threaded into the anchor blocks 91.

The parts of the hydraulic mechanism thus far described are easily assembled in the housing and secured in place by the bolts 92.

A piston 95 is positioned within the cylinder 80 between its end walls, the piston rod 58 being secured to the piston as shown in the drawings.

Figure 6:
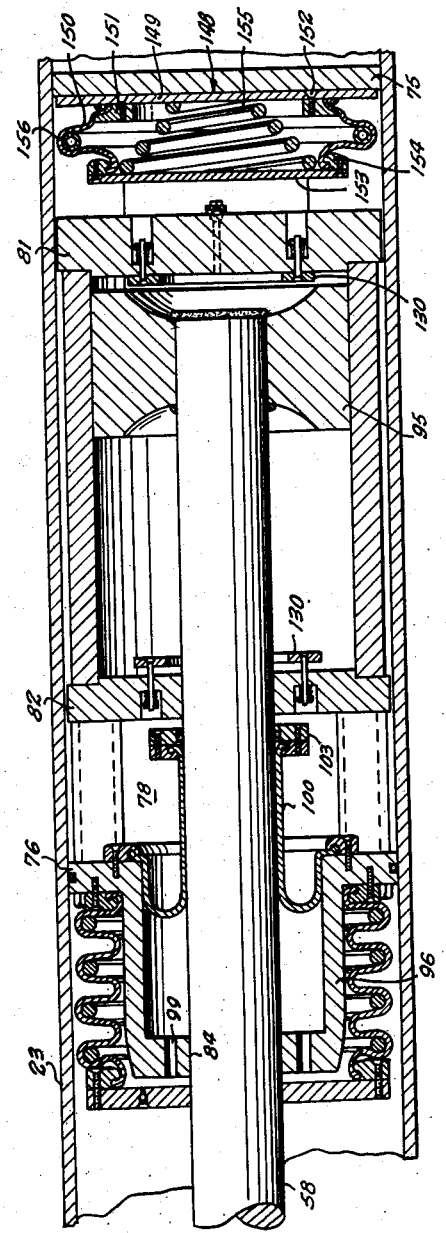
Fig. 6 is a sectional view similar to Fig. 4 of the hydraulic mechanism showing the parts in a different operative position.

It will be understood that the piston is fixed relative to the center sill by the anchoring of the piston rod 58 at its rear end, as explained hereinbefore, and that the cylinder slides relatively to the piston as the housing 23 is reciprocated. The draft appliance is so constructed and arranged that with the housing in full forward position as shown in Fig. 4, the rear face of the piston is spaced slightly forwardly of the rear end wall 82 of the working cylinder. The housing is stopped in its most forward position by abutment of the key 30 with the forward ends of the slots in the side walls of the center sill, as pointed out hereinbefore. With the housing in its rearmost position, as shown in Fig. 6, it will be seen that the front face of the piston is spaced slightly rearwardly of the front wall 81 of the working cylinder. Rearward movement of the housing is limited to this position by abutment of the striker collar 25 on the housing with the striker plate 26 on the center sill, as explained hereinbefore. If forward and rearward movement of the housing 23 and the working cylinder were not limited as described, the end walls of the working cylinder would strike the piston with resulting irreparable damage to the hydraulic mechanism.

Before proceeding to a further explanation of the construction and operation of the hydraulic mechanism, it will be desirable to describe the means for sealing the piston rod where it passes through the rear end wall 76 of the housing. The housing end wall bearing 84 (see Fig. 4) is formed in a rearward cylindrical extension 96 of the housing end wall. The bearing 84 is sealed interiorly of the housing by a rolling bellows seal designated generally as 97. The bearing is sealed exteriorly of the housing by a bellows seal designated by the general reference numeral 98. Holes or passages 99 are provided in the housing end wall to establish communication between the space within the exterior sealing member and the space within the interior sealing member.

The interior sealing unit 97 includes a flexible sleeve member 100 surrounding the piston rod and hermetically sealed at one end to the housing end wall and at the other end to the piston rod. The end of the sleeve 100 that is sealed to the inner side of the housing end wall is secured to the latter by means of a clamping ring 101 fastened to the end wall by screws 102. The joint between the sleeve, clamping ring and end wall may be made leak-proof by application of a sealing compound, preferably one that is not affected by oil or other hydraulic fluid in the chamber 78. The end of the flexible sleeve 100 that is sealed to the rod is received in a split collar 103 that is carried by and sealed to the piston rod. A sealing compound may be employed at the joint to ensure against leakage.

The action of the rolling bellows seal in operation can be visualized by comparing Fig. 4 with Fig. 6. As the housing moves to the rear from the Fig. 4 position to the Fig. 6 position, the outer fold of the flexible sleeve rolls away from the inner wall of the cylindrical extension 96 and forms an inner fold upon the piston rod 58. In forward movement of the housing 23, a reverse rolling action occurs to return the flexible sleeve to the position shown in Fig. 4.

The exterior sealing unit 98 is of the simple bellows type including a flexible bellows sleeve 104 hermetically sealed at its forward end to the housing end wall and at its rearward end to the piston rod 58. Rings 105 are disposed within the bellows sleeve to hold the latter in transversely expanded position. The front end of the bellows sleeve 104 is secured to the housing end wall by a clamping ring 106 that is screwed to the end wall by screws 107. A sealing compound may be used at the joint. A flange 108 is mounted on the piston rod 58 and sealed thereto and the rear end of the bellows sleeve 104 is secured to the flange by a clamping ring 109 fastened to the flange by screws 110. Sealing compound may also be used to secure a tight joint at this point.

Figure 13:
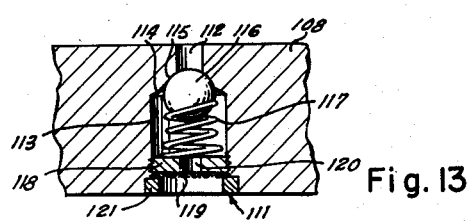
Fig. 13 is an enlarged, fragmentary sectional view of a check valve forming a part of the bellows seal of the hydraulic mechanism of Figs. 4 to 6.

In the flange 108 is an outwardly opening, spring-pressed ball check valve means 111 that is shown in enlarged detail in Fig. 13. Referring to Fig. 13, the check valve means 111 includes a port 112 communicating with the interior of the bellows sealing means. A bore 113 of larger diameter than the port 112 is provided in the flange. Shoulders 114 provide a seat 115 for the ball valve element 116. A light spring 117 normally urges the ball against the seat. The outer end of the spring bears against a ring 118 that is screwed into the threaded portion of the bore 113. A dust filter screen 119 covers the opening 120 of the ring and is held in position by a press-fitted retainer ring 121 in the mouth of the bore 113.

The spaces inside the sealing sleeves are partially evacuated. Such evacuation is effected by withdrawing air from the spaces through ball check valve means 111 in preparing the draft appliance for service. An absolute pressure of approximately one-half an atmosphere is desirable within the sealing units, but this pressure may be varied considerably with pressure as low as about one-tenth of an atmosphere to as high as about three-fourths of an atmosphere absolute being acceptable.

If, during service, some air should leak into the bellows, and the pressure should rise to a value higher than desired, the exterior bellows seal might be blown out upon violent movement of the housing toward buff position. However, the ball check valve means functions to obviate this possibility. If the absolute but subatmospheric pressure within the bellows should rise too high, movements of the draft appliance in buff will cause the check valve 111 to open and allow excess air to escape. When the pressure has been lowered to a desired point, the check valve 111 closes to maintain the desired lower pressure within the bellows.

The tubular bellows sealing arrangement gives practically complete protection to the bearing 84 in which the piston rod slides. This bearing preferably fits the piston rod with a loose sliding fit which is made possible by the use of the novel sealing means described. Some lubricant may be included within the bellows to lubricate the bearing 84 or it may be run dry if desired.

A modified form of piston rod sealing means is shown in Fig. 18. In this figure, parts corresponding to similar parts in Figs. 4, 5, and 6 are designated by the same but primed reference numerals. The operative position of the housing as shown in Fig. 18 corresponds to the operative position of the housing shown in Fig. 4 wherein the housing is in full buff position.

In the device of Fig. 18, the internal sealing member 97' has a rolling sleeve 100' similar to the sleeve member 100 of the device of Fig. 4. This sleeve is secured to the rear end wall 76' by clamping ring 101' fastened to the end wall by screws 102'. The end of the sleeve 100' that is hermetically sealed to the rod is received in a groove 122 in the rod 58' and is retained in the groove by means of a constricting ring 123. The action of the sleeve 100' is similar to the action of the sleeve 100 of the mechanism of Fig. 4.

The exterior bellows seal 98' is also of the rolling sleeve type. A cup-shaped member 124 is hermetically sealed to the rod 58' with the open end of the cup facing the rear end wall 76'. The rear end of the flexible sleeve 125 is sealingly secured to the rim of the cup-shaped member 124 by a clamping ring 126 fastened to the rim of the cup-shaped member by screws 127. When the housing 23' is moved in a forward direction, the flexible sleeve 125 rolls away from the outer side wall of the cylindrical extension 96' and onto the interior of the side wall of the cup-shaped member 124. The reverse action takes place when the housing is moved from a forward position to a rearward position.

Figure 12:
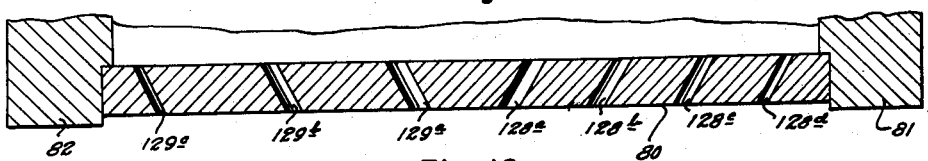
Fig. 12 is an enlarged, fragmentary sectional view taken along the line 12—12 of Fig. 9.

Returning to consider further the working cylinder of the hydraulic mechanism, Fig. 12 shows the openings in the working cylinder side wall that primarily control the damping action of the draft appliance. Four openings 128a, 128b, 128c, 128d are formed in the tubular side wall 80 of the working cylinder in the front half of the working cylinder. These openings are inclined toward the cylinder's rear end wall 82 in a direction outwardly of the cylinder so that hydraulic fluid that is forced out through the openings by piston action is directed rearwardly for return to the working cylinder.

A similar set of openings 129a, 129b, 129c is drilled through the rear half of the side wall 80. These holes are inclined toward the cylinder's front end wall 81 in a direction outwardly of the cylinder so that liquid expressed through them is directed forwardly to return to the forward end of the cylinder.

Although the piston 95 is not shown in Fig. 12, when the housing is in full forward position or in neutral position, the piston covers the openings 129a, 129b, 129c. Also, when the housing is in full buff position, the piston covers the openings 128a, 128b, 128c, 128d. Thus, the openings in the forward half of the cylinder control movement of the working cylinder and housing in buff, and the openings in the rear half of the cylinder control movement of the cylinder and housing in draft.

The cross-sectional areas of the holes 128 gradually diminish from rear to front. Similarly, the cross-sectional areas of the holes 129 gradually diminish from front to rear. With the housing in full pull-out position and the piston covering the openings 129, if the housing is moved suddenly rearwardly as a result of coupling impact, for example, the openings 128 are progressively closed by the piston from rear to front. The initial resistance to movement of the housing is relatively small compared to the resistance near the end of the rearward stroke but rapidly builds up as the cylinder slides rearwardly and the openings 128 are progressively closed by the piston to reduce the aggregate outlet area in the forward end of the cylinder.

A similar action occurs when the housing is in full buff position and is suddenly pulled forwardly as by the starting of a train. The cylinder moves forwardly over the piston to progressively close the openings 129a, 129b, 129c and to progressively increase resistance to forward movement of the cylinder and housing. Although only one line of openings 128 and 129 is shown in Fig. 12, it will be understood that a plurality of such openings may be provided depending upon the requirements of the hydraulic mechanism. A second set of openings 129 is indicated by way of example in Fig. 9 at the right-hand side of the cylinder.

Referring to Fig. 4, inwardly opening check valves 130 are provided in the front and rear end walls of the working cylinder. These check valves open as they are moved away from the piston and are closed as they are moved towards the piston as the housing 23 slides in the center sill. These check valves provide principal channels for the return flow of hydraulic fluid to the end of the cylinder that is moved away from the piston. Opening of the valves relieves any tendency to pull a vacuum in the end of the working cylinder that is moving away from the piston. The valves also prevent undue build up of pressure in the chamber 78 surrounding the working cylinder by providing return flow channels for liquid expressed from the opposite end of the working cylinder. The total cross-sectional area of the openings of check valves 130 is large enough to accommodate flow of all liquid expressed from the opposite end of the cylinder without creating substantial back pressure. To this end, the aggregate port area of each valve 130 must be at least as large as the aggregate of the openings in the side wall of the cylinder in the end thereof opposite to the particular check valve. Preferably, the total cross-sectional area of the ports of the valves is greater than this to accommodate return flow of any fluid leaking from the opposite end of the cylinder and also return flow from certain relief valves to be described hereinafter.

Figure 11:
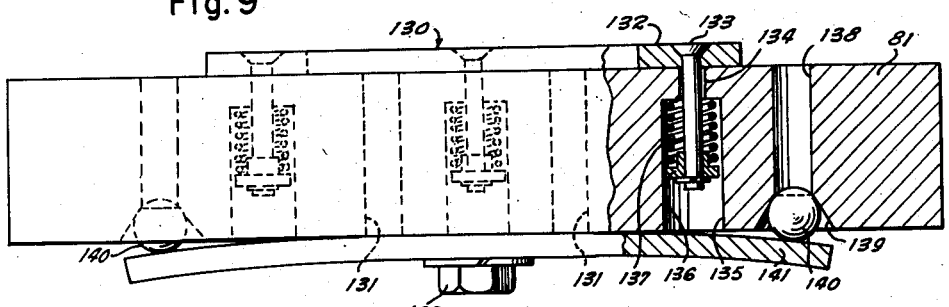
Fig. 11 is a side elevational view on yet a further enlarged scale of the front end wall of the cylinder of the hydraulic mechanism shown in Figs. 4 to 6, parts being broken away to show details of construction.

The detailed construction of the valve 130 in the front end wall of the working cylinder is best seen in Figs. 10 and 11 to which reference is now made. Valve ports 131 are drilled through the front end wall 81 of the cylinder. As seen in Fig. 10, these ports are eight in number and are arranged circularly. The ports 131 are closed by a valve ring 132. The valve ring has pins 133 sliding in bores 134 and extending into counterbores 135 in the cylinder end wall 81. Each pin has at its inner end a collar 136. A compression spring 137 acting between the pin collar 136 and the inner end of the counterbore 135 serves to urge the pin and valve ring into position to close the ports 131. Springs 137 are of such size that they will yield easily to allow the valve ring 132 to uncover the ports 131 as the end wall 81 moves away from the piston. The check valve 130 in the rear end wall 82 of the working cylinder is identical to the check valve in the front end wall 81.

It may happen that excessive impact or draft forces sometimes are encountered in service that would exceed the strength of the working cylinder having only the permanently-open side wall openings 128 and 129. Pressure relief valves may be provided in the side wall and end walls of the working cylinder to relieve excessive pressures within the working cylinder. One set of such pressure relief valves in the forward end wall 81 of the working cylinder is shown in Figs. 10 and 11. Pressure relief valve ports 138 having ball valve seats 139 are provided in the front end wall 81 of the working cylinder. Ball valve elements 140 are seated in the seats 139. A leaf spring 141 has its ends resting on the balls 140, the spring being fastened at its mid-point to the end wall 81 by a screw 142. The weight of the spring is so selected that the balls 140 are urged into valve closing position by a pre-determined force. This force may be varied by applying shims between the spring and the end wall where the spring is fastened to the end wall.

Fig. 15 shows a similar pair of pressure relief valves in the side wall 80 of the working cylinder. Here the pressure relief valve port 138' is positioned about one-fifth of the length of the cylinder rearwardly from the forward end wall thereof and the pressure relief valve port 138" is positioned about one-seventh of the length of the cylinder forwardly of the rear end wall 82.

Figure 14:
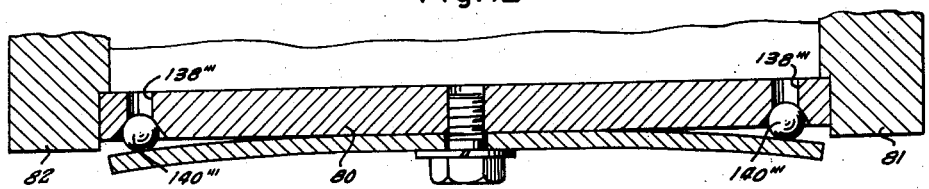
Fig. 14 is an enlarged, fragmentary sectional view taken along the line 14—14 of Fig. 9.

In Fig. 14, showing alternative locations for the pressure relief valve ports, the ports 138''' are positioned in the side wall 80 of the working cylinder close to the front and rear end walls thereof, respectively.

The pressure relief valves in the side and end walls of the working cylinder are preferably adjusted to open at different pressures within the working cylinder. By way of example, the valve 140' of Fig. 15 may be set to open at 6,000 lbs. per square inch; the valve 140" of Fig. 15 may be set to open at 7,000 lbs. per square inch cylinder pressure; the valves 140''', Fig. 14, may be set to open at 9,000 lbs. per square inch; and the forward end wall pressure relief valves 140, Fig. 11, may be set to open at 10,000 lbs. per square inch pressure in the working cylinder.

As mentioned earlier in this description, the piston rod anchor is locked against turning by means of an off-center pin 73 extending from the transverse impact plate 70 into the anchor knob assembly. Since the piston rod is prevented from rotating, so also the piston is prevented from rotating since it is securely mounted on the rod. The purpose of this construction will become apparent as the description, with reference to Figs. 16 and 17, proceeds.

As seen in Fig. 17, the piston 95 is in the position it occupies when the draft appliance is in neutral or rest position. It will be seen that a volume of hydraulic fluid is trapped between the piston 95 and the rear end wall 82 of the cylinder. Remembering that the housing 23 may move forwardly a slight distance from neutral position to the point where the key 30 strikes the front ends of the slots 28 in the side walls of the center sill, a construction is provided to permit escape of the trapped hydraulic fluid during this last increment of forward movement of the housing and to throttle the escaping fluid to provide a cushioning action in the starting of a train of cars embodying the draft appliance of the invention. To this end, the periphery of piston 95 is provided with a groove having a blind terminal portion 143 extending parallel to the direction of piston movement for a distance slightly greater than the distance from the piston to the rear end wall 82 when the parts are in neutral position as seen in Fig. 17. The terminal portion of the groove registers with a port 144 in the side wall 80 of the cylinder, the left-hand end of the terminal portion of the groove being in registry with the port 144 when the parts are in the illustrated position. The groove has a peripherally extending portion 145 that merges into another longitudinal groove portion 146 that is arcuately off-set from the terminal portion 143. The arcuately off-set groove portion 146 opens at 147 in the face of the piston adjacent the rear end wall 82. It will be seen that fluid trapped between the piston 95 and the end wall 82 may escape from the end of the cylinder solely through the groove opening 147, the off-set portion 146 of the groove, the arcuately extending groove section 145 and the port 144 to the chamber that surrounds the working cylinder. This channel of communication is maintained open as the cylinder moves from left to right as seen in Fig. 17, since the port 144 stays in registry with the blind terminal portion 143 of the groove until the cylinder reaches its most forward position. As the cylinder is moved to the left from the position shown in Fig. 17, the port 144 rides over a solid part of the periphery of the piston and the port is inoperative during this part of the stroke. The port 144 thus is seen to control the buffer action of the hydraulic mechanism during the increment of movement of the housing and associated parts from neutral position to full forward position when the openings 129 are closed by the piston 95.

As has been discussed hereinbefore, the space within the housing chamber 78 and the space within the working cylinder are completely filled with a non-compressible hydraulic fluid such as lubricating oil. Means is provided within the chamber 78 for compensating volume changes within the housing occasioned by piston rod displacement and also changes due to temperature variations which cause expansion and contraction of the hydraulic fluid and the metal parts of the hydraulic mechanism. It will be seen that, as the piston rod 58 enters the chamber 78 on the instroke of the housing 23, the effective internal volume of the chamber 78 is diminished. Conversely, the chamber volume is increased as the piston rod emerges upon forward movement of the draft appliance. A vacuum filled compensating unit 148 is placed in the chamber 78 in the forward end thereof. This compensating unit is similar to that disclosed in my prior copending applications referred to hereinbefore. It includes a base plate 149 that may be approximately square in cross-section and that can be inserted in the housing from the open end thereof during assembly of the apparatus. The base plate may be staked or otherwise suitably secured in the position illustrated in Figs. 4 to 6.

The compensating unit has an expansible and contractible bellows section 150 hermetically sealed to the base plate by a clamping ring 151 fastened to the base plate by screws 152. The compensating unit has a cover plate 153 to which the other end of the bellows is hermetically sealed by clamping ring 154. Within the compensating unit and compressed between the base plate 149 and cover plate 153 is a compression spring 155. This spring may be wound in the form of a truncated cone to telescope in compression to permit maximum collapse of the compensating unit as pressure of the surrounding hydraulic fluid increases. Moreover, the spring 155 is non-linear in reaction; that is to say, initial increments of compressional force applied to it will result in axial displacements that are relatively large compared to the axial displacements resulting from the application of subsequent increments of compressional force; the application of the latter results in ever decreasing increments of axial displacement. An expander ring 156 holds the side walls of the bellows 150 outwardly against radial collapse.

The interior of the compensating unit is substantially evacuated. Although the absolute pressure within the compensating unit may vary, it has been found that a high degree of vacuum or low absolute gas pressure within the compensating unit is highly desirable in order that the compensating unit may be substantially insensitive to temperature variations. The pressure within the compensating unit may be of the order of 1″ of mercury absolute although it may be somewhat higher without increasing the sensitivity of the unit to temperature changes.

Under approximately one atmosphere of pressure absolute on the exterior of the compensating unit, and with an absolute pressure within the unit of 1″ of mercury absolute, the spring 155 holds the unit extended in approximately the configuration shown in Fig. 4. In other words, the compensating unit would appear as shown in Fig. 4 when assembled and under an external pressure of one atmosphere.

When the draft appliance is in the full buff position as shown in Fig. 6, the volume of the chamber 78 has been decreased. In order to compensate for this decrease in chamber volume, the compensating unit collapses to the position shown in Fig. 6. Such collapse occurs without substantially increasing the pressure within the chamber. Since the space within the compensating unit is substantially evacuated, there is no gas to compress and the sole increase in static pressure in the chamber 78 is occasioned by compression of the spring 155.

Although the operation of the draft appliance of the present invention should be clear from the foregoing detailed description, such operation may be summarized briefly as follows.

Let us first consider the operation of the draft appliance in coupling a car equipped with the appliance into a train. In this operation, the car to be coupled into the train is ordinarily allowed to coast down an inclined track and to strike the rear of a standing train of cars that is being made up. The coupling impact is severe and oftentimes results in damage to the car or its draft gear or lading.

Assuming that the moving car is equipped with a draft appliance in accordance with the present invention, the draft appliance prior to coupling will be in the neutral position illustrated in Figs. 1 and 2. In this position the piston 95 is in the position shown in Fig. 17 which is slightly forward of its position as shown in Fig. 4. Upon impact with the rear car of the train being made up, the housing 23 is forced suddenly rearwardly in the center sill 20. Referring to Fig. 4, check valve 130 in the front wall of the working cylinder closes and check valve 130 in the rear wall of the working cylinder opens. Hydraulic fluid is forced out of the working cylinder into the chamber 78 through the openings 128. Fluid flowing from the openings 128 flows rearwardly in the chamber 78 directed by the inclination of the holes 128. The check valve 130 in the rear end wall of the cylinder being open, the end of the cylinder behind the piston is being filled with hydraulic fluid as the cylinder slides rearwardly over the piston. The total area of the check valve ports is sufficient to prevent cavitation in this end of the cylinder, this cross-sectional area being as great as and preferably greater than the aggregate cross-sectional area of the openings 128.

As the draft appliance moves rearwardly, the piston rod 58 moves into the chamber 78 reducing its volume and tending to increase static pressure of fluid that completely fills the chamber 78. However, fluid thus displaced collapses the compensating unit 148 to the degree necessary and thus prevents any undue build up of pressure within the housing.

The total area and the disposition of the openings 128 are so selected that under ordinary coupling conditions, internal cylinder pressures do not exceed those for which the apparatus is designed.

The position of the cylinder with relation to the piston at full impact or buff position is shown in Fig. 6. The draft appliance is so designed that under ordinary conditions of coupling, the cylinder falls short of reaching its full inward position. However, should an extraordinarily high impact occur, the full inward position of the housing will be reached and a further movement of the housing will be stopped by abutment of the striker collar 25 on the housing with the striker plate 26 on the center sill.

In starting a train having a car equipped with one of the draft appliances of the invention, the engineer will back the locomotive to take the slack out of the train. In so doing, the draft appliance of the invention is pushed rearwardly to its full buff position shown generally in Fig. 3. The parts of the hydraulic buffer mechanism will assume the positions shown in Fig. 6, with the piston 95 closing the openings 128 in the side wall of the cylinder. In starting the car in question, draft forces are applied to the coupler 33 to move the housing 23 forwardly in the center sill. Referring to Fig. 6, check valve 130 in the rear end wall 82 is closed and check valve 130 in the front cylinder wall 81 is opened. Hydraulic fluid is forced out of the openings 129 in the rear end of the cylinder and fluid thus displaced into the chamber 78 returns to the forward end of the cylinder through the now open check valve 130. Because of the more gradual, steady pull encountered in starting a train, the openings 129 are generally fewer in number and have an aggregate cross-sectional area less than the openings 128 which control impact movement. As the housing 23 moves forwardly in the center sill, the piston rod 58 is drawn out of the housing to increase the volume of the chamber 78. Such increase in volume is compensated for by appropriate expansion of the compensating means 148. Under continuous pull, the draft appliance will be fully extended and limited in its forward movement by abutment of the key 30 with the forward end of the slots 28 in the side wall of the center sill. In this position draft forces are applied to the car through the key 30 pulling directly on the center sill.

If the train should be started with the draft appliance in neutral position and without first taking the slack out of the train, the draft forces will be cushioned by hydraulic fluid flowing through the port 144 as explained in connection with the description of Figs. 16 and 17 hereinbefore.

From the foregoing description, it will be seen that the present invention provides a railway draft appliance that accomplishes the aims and objects of the invention. Various modifications will occur to persons merely skilled in the art without departing from the spirit and scope of the invention.

I claim:

1. In a railway car having a center sill and the like, a draft appliance comprising: a housing supported in and slidable longitudinally in said center sill, said housing enclosing a double-acting hydraulic buffer mechanism having a longitudinally disposed cylinder member, a piston member in said cylinder member slidable longitudinally with respect to said cylinder member through a preselected working stroke, one of said members being anchored to said housing and the other of said members having an operating rod extending rearwardly from the housing; anchor means fixedly mounting a rearwardly extending part of said operating rod to said center sill preventing longitudinal movement of said rod with respect to said sill; complementary stop means carried by said housing and said center sill limiting forward and rearward movement of said housing in said center sill, said stop means being longitudinally spaced apart a distance equal to the length of said working stroke, said stop means being positioned to permit longitudinal movement through said working stroke of the member anchored to said housing; and means for applying buff and draft forces to said housing.

2. In a railway car having a center sill and the like, a draft appliance comprising: a housing supported in and slidable longitudinally in said center sill, said housing having a portion extending forwardly of said center sill, said housing enclosing a double-acting hydraulic buffer mechanism having an operating rod extending rearwardly from the housing; anchor means fixedly mounting a rearwardly extending part of said operating rod to said center sill preventing longitudinal movement of said rod with respect to said sill; opposed longitudinally extending slot means in said center sill; a key fixed to said housing, said key extending through said slot means and limiting forward movement of said housing by abutment with the forward ends of said slot means; a striker plate carried by said center sill at its forward end; a striker collar fixed to the forwardly extending portion of said housing and being positioned to limit rearward movement of said housing by abutment with said striker plate; and means for applying buff and draft forces to said housing.

3. In the combination defined in claim 2, resilient means exterior to said housing acting between said center sill and said housing urging said housing forwardly in said center sill.

4. In the combination defined in claim 2, first resilient means exterior to said housing acting between said center sill and said housing urging said housing forwardly in said center sill and second resilient means exterior to said housing and stronger than said first resilient means acting between said center sill and said housing in a direction opposite to said first resilient means and urging said housing rearwardly in said center sill from its most forward position to an intermediate position only.

5. In a railway car having a center sill and the like, a draft appliance comprising: a housing supported in and slidable longitudinally in said center sill, said housing having a portion extending forwardly of said center sill, said housing enclosing a hydraulic buffer mechanism having an operating rod extending rearwardly from the housing; anchor means mounting the rearward end of said operating rod to said center sill; opposed longitudinally extending slot means in said center sill; a key fixed to said housing, said key extending through said slot means and limiting forward movement of said housing by abutment with the forward ends of said slot means; a striker plate carried by said center sill at its forward end; a striker collar fixed to the forwardly extending portion of said housing and being positioned to limit rearward movement of said housing by abutment with said striker plate; a pair of brackets, one mounted on each side of said center sill rearwardly of said slots; a pair of longitudinally extending yoke rods, one fixed to each side of said key, each rod being slidably supported in one of said brackets; first spring means acting between said brackets and said yoke rods urging said yoke rods forwardly throughout the scope of movement of said housing; second spring means stronger than said first spring means acting between said brackets and said yoke rods in a direction opposite to said first spring means and only from the most forward position of said housing to an intermediate position thereof; and means for applying buff and draft forces to said housing.

6. In a railway car having a center sill and the like, a draft appliance comprising: a housing supported in and slidable longitudinally in said center sill, said housing having a portion extending forwardly of said center sill, said housing enclosing a hydraulic buffer mechanism having an operating rod extending rearwardly from the housing; anchor means mounting a rearwardly extending part of said operating rod to said center sill; opposed longitudinally extending slot means in said center sill; a key fixed to said housing, said key extending through said slot means and limiting forward movement of said housing by abutment with the forward ends of said slot means; a striker plate carried by said center sill at its forward end; a striker collar fixed to the forward end of said housing and being positioned to limit rearward movement of said housing by abutment with said striker plate; and a coupler having a shank providing a transverse opening therethrough, said coupler being disposed with its coupling elements positioned forwardly of said housing and with its shank extending into the forward end of said housing, said key passing loosely through the opening in said shank, the rear wall of said opening engaging the rear of said key whereby draft forces applied to said coupler are transmitted to said housing solely through said key.

7. In the combination defined in claim 6, a collar on the shank of said coupler positioned forwardly of said striker collar, the distance from the rear wall of the opening in said shank to the rear face of said shank collar being greater than the distance from the rear of said key to the front face of said striker collar, and the distance from the front wall of the opening in said shank to the rear face of said shank collar being less than the distance from the front of said key to the front face of said striker collar, whereby draft forces applied to said coupler are transmitted to said housing solely through said key and buff forces applied to said coupler are transmitted to said housing solely through said shank collar.

8. In the combination defined in claim 6, a collar on the shank of said coupler positioned forwardly of said striker collar, the distance from the rear wall of the opening in said shank to the rear face of said shank collar being greater than the distance from the rear of said key to the front face of said striker collar, and the distance from the front wall of the opening in said shank to the rear face of said shank collar being less than the distance from the front of said key to the front face of said striker collar, whereby draft forces applied to said coupler are transmitted to said housing solely through said key and buff forces applied to said coupler are transmitted to said housing solely through said shank collar, said coupler being pivotable about said key in the plane thereof, the front face of said striker collar and the rear face of said shank collar being substantially cylindrically curved about the pivot axis of said coupler.

9. In a railway car having a center sill and the like, a draft appliance comprising: a housing supported in and slidable longitudinally in said center sill, said housing enclosing a double-acting hydraulic buffer mechanism having a longitudinally disposed cylinder member, a piston member in said cylinder member slidable longitudinally with respect to said cylinder member through a preselected working stroke, one of said members being anchored to said housing and the other of said members having an operating rod extending rearwardly from the housing; anchor means mounting the rear end of said operating rod to said center sill, said anchor means including a knob carried by the rear end of said operating rod, said knob having a convex rear surface and a convex front surface, a buff plate having a concave surface complementary to and in contact with the rear face of said knob, a draft plate having a concave surface complementary to and in contact with the front face of said knob, and transverse members mounted to said center sill restraining said plates from longitudinal movement; complementary stop means carried by said housing and said center sill limiting forward and rearward movement of said housing in said center sill, said stop means being longitudinally spaced apart a distance equal to the length of said working stroke, said stop means being positioned to permit longitudinal movement through said working stroke of the member anchored to said housing; and means for applying buff and draft forces to said housing.

10. In the combination defined in claim 9, resilient means connected between said buff plate and said draft plate urging the plates towards each other to grip said knob therebetween.

11. A shock-resisting hydraulic mechanism for railway car draft gear and the like comprising: an elongated housing including integral side walls, an integral end wall and a removable end wall sealingly engaging said side walls opposite to said integral end wall; a cylinder within said housing having side walls and end walls spaced respectively from the side walls and end walls of said housing, the end walls of said cylinder having flanges projecting radially beyond the side walls of said cylinder, a piston reciprocable within said cylinder; a piston rod connected to said piston and extending to the exterior through an end wall of said cylinder and sealingly through an end wall of said housing; first spacer means disposed within said housing between the integral end wall thereof and the adjacent end wall of said cylinder, second spacer means extending between the removable end wall of said housing and the other end wall of said cylinder; and adjustable fastening members extending through said cylinder flanges and acting in tension betwen said removable end wall and said housing to draw together said removable end wall, said spacer means and said cylinder.

12. A shock-resisting hydraulic mechanism for railway car draft gear and the like comprising: an elongated housing including integral side walls, an integral end wall and a removable end wall slidably and sealingly engaging said side walls opposite to said integral end wall, said housing providing a chamber substantially rectangular in transverse section; a cylinder in said chamber having side walls and end walls spaced respectively from the side walls and end walls of said housing, the end walls of said cylinder having flanges projecting radially beyond the side walls of said cylinder and slidably engaging the side walls of said housing, the side walls of said cylinder being in the form of a tubular section extending between the cylinder end walls; a piston reciprocable within said cylinder; a piston rod connected to said piston and extending to the exterior through an end wall of said cylinder and sealingly through said removable end wall of said housing; anchor blocks disposed in and secured to said housing between the integral end wall thereof and the adjacent end wall of said cylinder with said adjacent end wall abutting said anchor blocks; spacer sleeves extending between the removable end wall of said housing and the other end wall of said cylinder; and bolts extending through said removable end wall, said spacer sleeves and said cylinder flanges and being threadedly received in said anchor blocks, whereby, when said bolts are tightened, said spacer sleeves and said cylinder end walls and tubular section are clamped together between said removable end wall and said anchor blocks.

13. A shock-resisting hydraulic mechanism comprising: a housing; a cylinder having end and side walls mounted in said housing and providing a chamber between said cylinder and said housing; a piston reciprocable in said cylinder between its end walls; a piston rod connected to said piston and reciprocably extending to the exterior through one of the end walls of said cylinder and sealingly through said housing; one end of said cylinder at one side of said piston providing openings communicating the interior of said one end of said cylinder with said chamber; and check valve means in the other end of the cylinder at the other side of said piston including port means in the wall of said cylinder communicating the interior of said other end of said cylinder with said chamber and a valve member inside said cylinder, said valve member moving outwardly to close said port means and inwardly to open the same, the aggregate cross-sectional area of said port means being at least as great as the aggregate cross-sectional area of the openings in said one end of said cylinder.

14. A shock-resisting hydraulic mechanism comprising: a housing; a cylinder having end and side walls mounted in said housing and providing a chamber between said cylinder and said housing; a piston reciprocable in said cylinder between its end walls; a piston rod connected to said piston and reciprocably extending to the exterior through one of the end walls of said cylinder and sealingly through said housing; one end of said cylinder providing a first group of openings through the side wall of said cylinder communicating the interior of said one end of said cylinder with said chamber, the other end of said cylinder providing a second group of openings through the side wall of said cylinder communicating the interior of said other end of said cylinder with said chamber; first inwardly opening check valve means in the end wall of said cylinder at said one end thereof having ports with an aggregate cross-sectional area at least as great as the aggregate cross-sectional area of the group of openings at said other end of said cylinder; and second inwardly opening check valve means in the end wall of said cylinder at said other end thereof having ports with an aggregate cross-sectional area at least as great as the aggregate cross-sectional area of the openings at said one end of said cylinder.

15. A shock-resisting hydraulic mechanism as defined in claim 14 wherein the openings of said first group are inclined outwardly toward said other end of said cylinder and the openings of said second group are inclined outwardly toward said one end of said cylinder.

16. A shock-resisting hydraulic mechanism as defined in claim 14 wherein pressure relief valve means are provided in the side walls of said cylinder, said valve means including means providing a passage through the side wall of the cylinder; a member in said passage closing the same and movable to open said passage in response to fluid pressure differential across said side wall; and resilient means biasing said member to said closed position.

17. A shock-resisting hydraulic mechanism comprising: a housing; a cylinder having end and side walls mounted in said housing and providing a chamber between said cylinder and said housing; a piston reciprocable in said cylinder between its end walls; a piston rod connected to said piston and reciprocably extending to the exterior through one of the end walls of said cylinder and housing; expansible and contractible sealing means surrounding said piston rod internally and externally of said chamber and connecting said rod to the end wall of said housing; orifice means providing communication between the spaces within said sealing means; and outwardly opening check valve means communicating the space within said external sealing means with the surrounding atmosphere.

18. A shock-resisting mechanism as defined in claim 17 wherein the space within said sealing means is at subatmospheric pressure.

19. A shock-resisting mechanism as defined in claim 17 wherein said external sealing means comprises a cup-shaped member carried by said piston rod with the open end of the cup facing the housing; and a flexible sleeve secured between the open end of said cup-shaped member and the end wall of the housing, said sleeve being adapted to roll on the interior surface of said cup-shaped member as said piston rod is reciprocated.

20. A shock-resisting mechanism as defined in claim 17 wherein said internal sealing means comprises a cylindrical extension of the end wall of said housing; and a flexible sleeve secured between the inner end of said cylindrical extension and said piston rod, said sleeve being adapted to roll on the interior surface of said cylindrical extension as said piston rod is reciprocated.

21. In a shock-resisting hydraulic mechanism including a cylinder having side walls and an end wall and a piston reciprocable in said cylinder to and from a point adjacent to said end wall, said piston having a longitudinally extending peripheral surface in sliding contact with the side walls of said cylinder, the improvement which comprises: said piston providing a groove in the periphery thereof, said groove opening at one end into the face of the piston adjacent said end wall and terminating at the other end in a blind terminal portion extending parallel to the direction of piston movement for a preselected distance, the terminal portion of said groove being arcuately displaced from the remainder of said groove; and the side wall of said cylinder providing a port therethrough positioned to register with the terminal portion of said groove.

22. In a railway car having a center sill extending longitudinally of the car, said center sill having opposed parallel longitudinal walls defining a space of rectangular transverse cross-section, a draft appliance comprising: a housing slidable longitudinally in said center sill on opposed parallel longitudinal housing faces slidably engaging the longitudinal walls of said center sill, said housing enclosing a double-acting hydraulic buffer mechanism having a longitudinally disposed cylinder member, a piston member in said cylinder member slidable longitudinally with respect to said cylinder member through a preselected working stroke, one of said members being anchored to said housing and the other of said members having an operating rod extending rearwardly from the housing; anchor means fixedly mounting a rearwardly extending part of said operating rod to said center sill preventing longitudinal movement of said rod with respect to said sill; complementary stop means carried by said housing and said center sill limiting forward and rearward movement of said housing in said center sill, said stop means being longitudinally spaced apart a distance equal to the length of said working stroke, said stop means being positioned to permit longitudinal movement through said working stroke of the member anchored to said housing; and means for applying buff and draft forces to said housing.

23. In a railway car having center sill extending longitudinally of the car, said center sill having opposed parallel longitudinal walls defining a space of rectangular transverse cross-section, a draft appliance comprising: a housing slidable longitudinally in said center sill on opposed parallel longitudinal housing faces slidably engaging the longitudinal walls of said center sill, said housing having a portion extending forwardly of said center sill, said housing enclosing a hydraulic buffer mechanism having an operating rod extending rearwardly from the housing; anchor means mounting the rearward end of said operating rod to said center sill; opposed longitudinally extending slot means in said center sill; a key fixed to said housing, said key extending through said slot means and limiting forward movement of said housing by abutment with the forward ends of said slot means; a striker plate carried by said center sill at its forward end; a striker collar fixed to the forwardly extending portion of said housing and being positioned to limit rearward movement of said housing by abutment with said striker plate; a pair of brackets, one mounted on each side of said center sill rearwardly of said slots; a pair of longitudinally extending yoke rods, one fixed to each side of said key, each rod being slidably supported in one of said brackets; first spring means acting between said brackets and said yoke rods urging said yoke rods forwardly throughout the scope of movement of said housing; second spring means stronger than said first spring means acting between said brackets and said yoke rods in a direction opposite to said first spring means and only from the most forward position of said housing to an intermediate position thereof; and means for applying buff and draft forces to said housing.

24. In a railway car having a center sill extending longitudinally of the car, said center sill having opposed parallel longitudinal walls defining a space of rectangular transverse cross-section, a draft appliance comprising: a housing slidable longitudinally in said center sill on opposed parallel longitudinal housing faces slidingly engaging the longitudinal walls of said center sill; a cylinder having end and side walls mounted in said housing and providing a chamber between said cylinder and said housing; a piston reciprocable in said cylinder between its end walls; a piston rod connected to said piston and reciprocably extending to the exterior through one of the end walls of said cylinder and sealingly through said housing; one end of said cylinder at one side of said piston providing openings communicating the interior of said one end of said cylinder with said chamber; and check valve means in the other end of the cylinder at the other side of said piston including port means in the wall of said cylinder communicating the interior of said other end of said cylinder with said chamber and a valve member inside said cylinder, said valve member moving outwardly to close said port means and inwardly to open the same, the aggregate cross-sectional area of said port means being at least as great as the aggregate cross-sectional area of the openings in said one end of said cylinder.

References Cited in the file of this patent

UNITED STATES PATENTS

| | | |
|---|---|---|
| 1,494,135 | Robinson et al. | May 31, 1924 |
| 1,772,387 | Dickerson | Aug. 5, 1930 |
| 2,816,670 | Edwards et al. | Dec. 17, 1957 |